United States Patent Office 2,762,818
Patented Sept. 11, 1956

2,762,818

4-HYDROXYTESTOSTERONE AND ESTERS THEREOF

Harold Levy and Morton L. Mednick, Worcester, Mass., assignors, by mesne assignments, to G. D. Searle & Co., Chicago, Ill., a corporation of Delaware No Drawing. Application May 26, 1955, Serial No. 511,436

4 Claims. (Cl. 260—397.4)

The present invention relates to 4-hydroxytestosterone and esters thereof. The chemical compounds which comprise this invention can be represented by the structural formula

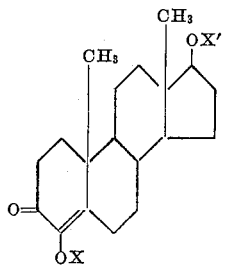

wherein X and X' are members of the group consisting of hydrogen and acyl radicals derived from hydrocarbon carboxylic acids containing fewer than 9 carbon atoms. The acyl radicals which X and X' can represent accordingly include formyl, acetyl, propionyl, butyryl, valeryl, hexanoyl, heptanoyl, octanoyl, and branched chain isomers of the foregoing. They can also represent the acyl radicals derived from hydrocarbon carboxylic acids which are cyclical or partially cyclical in structure such as cyclopentanepropionic acid, cyclohexaneacetic acid, and benzoic acid.

The compounds of this invention can be conveniently prepared from testosterone and its hydrocarbon carboxylic acid esters through the intermediate compounds obtained by the addition of two hydroxyl groups to the 4,5-double bond. For example the treatment of testosterone acetate in tert.-butanol with hydrogen peroxide and osmium tetroxide results in the formation of the 17-monoacetate of 3-oxoandrostane-4,5,17-triol, originally described by Butenandt and Wolz, Berichte der Deutschen Chemischen Gesellschaft, 71, 1486 (1938) who prepared it by a reaction conducted in ether as a solvent. In carrying out our invention it is not necessary to purify this material. We have found that the 17-monoacetate of 4-hydroxytestosterone can be obtained by subjecting the crude 17-monoacetate of 3-oxoandrostane-4,5,17-triol to one of a variety of dehydrating media, whereby only the hydroxyl group attached to the 5-position is lost by dehydration. Among the reaction media which we have found to be suitable and convenient in effecting the dehydration of the 17-monoacetate of 3-oxoandrostane-4,5,17-triol to the 17-monoacetate of 4-hydroxytestosterone are a refluxing solution of p-toluenesulfonic acid in toluene and a warm solution of concentrated hydrochloric acid in glacial acetic acid. Other 17-mono esters of 4-hydroxytestosterone are prepared by subjecting the corresponding ester of testosterone to the oxidizing action of hydrogen peroxide and osmium tetroxide, followed by dehydrating the intermediate 17-mono ester of 3-oxo-androstane-4,5,17-triol by the action of one of the dehydrating media described hereinbefore. 4-Hydroxytestosterone is conveniently prepared by the basic hydrolysis of one of its esters. It can also be prepared by subjecting testosterone to the oxidizing action of hydrogen peroxide and osmium tetroxide, suitably in tert.-butanol solution, followed by dehydrating the resulting 3-oxoandrostane-4,5,17-triol with one of the dehydrating media described hereinbefore.

The hydroxyl groups of 4-hydroxytestosterone are esterified by treatment of this compound with anhydrides or with acid chlorides derived from hydrocarbon carboxylic acids.

The compounds of this invention are valuable for their hormonal properties. They have androgenic and anabolic properties and are useful in the treatment of states of androgen deficiency and in promoting the retention of nitrogen in metabolic processes.

The following examples are set forth by way of illustration only. It will be understood that the invention is not to be construed as limited in spirit or in scope by the details contained therein, as it will be apparent to those skilled in the art that many modifications in materials and methods can be made without departing from the scope of the invention. In these examples temperatures are given in degrees Centigrade, and quantities of materials in parts by weight.

*Example 1*

A solution of 1.773 parts of testosterone acetate in 43 parts of tert.-butanol is treated by the addition of 4.9 parts of 30% hydrogen peroxide and then by 0.0988 part of osmium tetroxide in 8 parts of tert.-butanol. After the mixture has stood at room temperature for 20 hours, an additional 1.1 parts of 30% hydrogen peroxide is added. After it has been allowed to stand for an additional 20 hours at room temperature, the mixture is concentrated in a vacuum to about one-third of its original volume, diluted with 50 parts of water, and extracted with 180 parts of ethyl acetate. The organic phase is washed first with 10% sodium bisulfite solution, then with 4% sodium bicarbonate solution and finally with water. Evaporation of the ethyl acetate solution yields a residual solid which is an impure preparation of the 17-monoacetate of 3-oxoandrostane-4,5,17-triol. For the purposes of carrying out this invention, it is convenient not to purify this product, but rather to subject the crude material to a dehydration reaction.

*Example 2*

A mixture of 9.27 parts of the crude 17-monoacetate of 3-oxoandrostane-4,5,17-triol as prepared in Example 1, 0.85 part of p-toluenesulfonic acid and 870 parts of toluene is heated under reflux for 1 hour. The cooled solution is washed successively with water, 4% sodium bicarbonate solution and additional portions of water. The residue obtained by concentrating the organic phase in a vacuum is redissolved in benzene and poured on a chromatography column prepared from silica gel. Elution of the column with a 2.5 volume percent solution of ethyl acetate in benzene affords the 17-monoacetate of 4-hydroxytestosterone. After further purification by recrystallization from methanol, this compound melts at 194–197° C. and has a specific rotation of +82° in chloroform solution. It shows infrared absorption maxima at 2.92, 5.78, 5.97, 6.10, and 8.05 microns, and an ultraviolet absorption maximum in methanol solution at 277 millimicrons with a molecular extinction coefficient of 13,480. In concentrated sulfuric acid it exhibits an ultraviolet absorption maximum at 317 millimicrons. This compound has the structural formula

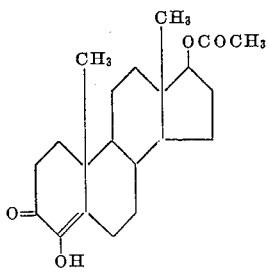

Example 3

A solution of 9.15 parts of the crude 17-monoacetate of 3-oxoandrostane-4,5,17-triol as prepared in Example 1, in 525 parts of glacial acetic acid, is treated by the addition of 9.5 parts of concentrated hydrochloric acid and the mixture is maintained at a temperature of 65–71° C. for 4 hours. The residue obtained by concentrating the reaction mixture in a vacuum is dissolved in 1350 parts of ethyl acetate. Acidic components are removed from this solution by washing it with several portions of 4% sodium bicarbonate solution and finally with water. The ethyl acetate solution is concentrated in a vacuum to a residual solid amounting to about 8.5 parts. This residue is dissolved in benzene and poured on a chromatography column prepared from silica gel. Elution of the column with a 2.5 volume per cent solution of ethyl acetate in benzene yields about 7.8 parts of the 17-monoacetate of 4-hydroxytestosterone, which is further purified by recrystallization from methanol. This product is identical with the product of Example 2.

Example 4

By the substitution of 1.85 parts of testosterone propionate for the testosterone acetate, the procedure of Example 1 affords the crude 17-monopropionate of 3-oxoandrostane-4,5,17-triol. Substitution of this product for the 17-monoacetate of 3-oxoandrostane-4,5,17-triol in Example 2 yields the 17-monopropionate of 4-hydroxytestosterone.

Example 5

By the substitution of 1.92 parts of testosterone butyrate for the testosterone acetate, the procedure of Example 1 affords the crude 17-monobutyrate of 3-oxoandrostane-4,5,17-triol. Substitution of this product for the 17-monoacetate of 3-oxoandrostane-4,5,17-triol in Example 2 yields the 17-monobutyrate of 4-hydroxytestosterone.

Example 6

By the substitution of 2.10 parts of testosterone benzoate for the testosterone acetate, the procedure of Example 1 affords the crude 17-monobenzoate of 3-oxoandrostane-4,5,17-triol. Substitution of this product for the 17-monoacetate of 3-oxoandrostane-4,5,17-triol in Example 2 yields the 17-monobenzoate of 4-hydroxytestosterone.

Example 7

By the substitution of 2.21 parts of testosterone cyclopentylpropionate for the testosterone acetate, the procedure of Example 1 affords the crude 17-monocyclopentylpropionate of 3-oxoandrostane-4,5,17-triol. Substitution of this product for the 17-monoacetate of 3-oxoandrostane-4,5,17-triol in Example 2 yields the 17-monocyclopentylpropionate of 4-hydroxytestosterone.

Example 8

A solution of 57 parts of the 17-monoacetate of 4-hydroxytestosterone in 12,000 parts of methanol is treated by the addition of 890 parts of 10% sodium hydroxide solution, and the mixture is maintained at room temperature for 2 hours in a nitrogen atmosphere. The excess sodium hydroxide is neutralized by the addition of glacial acetic acid and most of the methanol is removed by concentration in a vacuum. The remaining mixture is diluted with several times its volume of water and extracted with ethyl acetate. The ethyl acetate extract is washed with dilute sodium bicarbonate solution and with water and is concentrated to dryness. The semi-solid residue is crystallized from a mixture of methanol and petroleum ether to yield 4-hydroxytestosterone. Further purification is achieved by recrystallization from ethyl acetate or from acetone. This compound melts at 225–226° C. with sublimation and shows a specific rotation of +102° in chloroform solution. It has infrared absorption maxima at 2.80, 2.86, 5.99, 6.04, 6.08, and 6.13 microns and an ultraviolet absorption maximum in methanol solution at 277 millimicrons with a molecular extinction coefficient of 11,960. In concentrated sulfuric acid it shows an intense absorption maximum at 308 millimicrons and a weak absorption maximum at 422 millimicrons. This compound has the structural formula

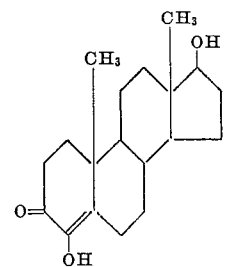

Example 9

A solution of 39 parts of the 17-monoacetate of 4-hydroxytestosterone and 163 parts of potassium bicarbonate in a mixture of 3600 parts of methanol and 1000 parts of water is heated under reflux for 4 hours and then concentrated in a nitrogen atmosphere until most of the methanol is removed. The remaining mixture is diluted with several times its volume of water, and the precipitated solid is collected on a filter and recrystallized from ethyl acetate to obtain 4-hydroxytestosterone, identical with the product of Example 8.

Example 10

A solution of 1 part of 4-hydroxytestosterone in 200 parts of acetic anhydride is heated under reflux for 1 hour and concentrated to dryness in a vacuum. The residue is dissolved in ethyl acetate, and this solution is washed with sodium bicarbonate solution and then with several portions of water. Evaporation of the ethyl acetate solution yields the diacetate of 4-hydroxytestosterone. This compound has the structural formula

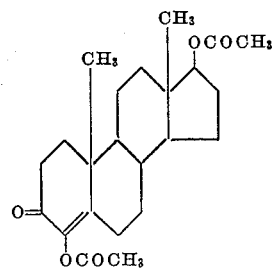

Example 11

A solution of 1 part of 4-hydroxytestosterone in 200 parts of valeric anhydride is heated on a steam bath for 4 hours and is then concentrated to dryness in a vacuum. A solution of the residue in ethyl acetate is washed with sodium bicarbonate solution and with water and is then concentrated to dryness. The product obtained is the divalerate of 4-hydroxytestosterone.

What is claimed is:
1. A compound having the structural formula

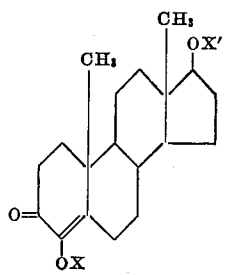

wherein X and X' are members of the group consisting of hydrogen and acyl radicals derived from hydrocarbon carboxylic acids containing fewer than 9 carbon atoms.
2. 4-hydroxytestosterone.
3. The 17-monoacetate of 4-hydroxytestosterone.
4. The 17-monopropionate of 4-hydroxytestosterone.

References Cited in the file of this patent
UNITED STATES PATENTS

| | | |
|---|---|---|
| 2,280,828 | Inhoffen | Apr. 28, 1942 |
| 2,602,803 | Kaufmann | July 8, 1952 |
| 2,683,725 | Murray | July 13, 1954 |